United States Patent
Edwards (10) Patent No.: US 7,093,588 B2
(45) Date of Patent: Aug. 22, 2006

(54) DUAL FUEL ENGINE CONTROL

(75) Inventor: John Edwards, Eden Valley (AU)

(73) Assignee: I-Sense Pty Ltd, Eden Valley South (AU)

( * ) Notice: Subject to any disclaimer, the term of this patent is extended or adjusted under 35 U.S.C. 154(b) by 0 days.

(21) Appl. No.: 10/505,657

(22) PCT Filed: Mar. 7, 2003

(86) PCT No.: PCT/AU03/00272

§ 371 (c)(1),
(2), (4) Date: Aug. 25, 2004

(87) PCT Pub. No.: WO03/076788

PCT Pub. Date: Sep. 18, 2003

(65) Prior Publication Data

US 2005/0121005 A1    Jun. 9, 2005

(30) Foreign Application Priority Data

Mar. 8, 2002    (AU) .................................. PS0942

(51) Int. Cl.
*F02M 41/00*  (2006.01)
(52) U.S. Cl. .................................. 123/525
(58) Field of Classification Search ................ 123/525, 123/575, 526, 528, 531, 27 GE, 300, 299
See application file for complete search history.

(56) References Cited

U.S. PATENT DOCUMENTS

| | | | |
|---|---|---|---|
| 4,641,625 A | 2/1987 | Smith | |
| 5,370,097 A | 12/1994 | Davis | |
| 5,526,786 A | 6/1996 | Beck et al. | |
| 5,526,797 A | 6/1996 | Stokes | |
| 5,937,800 A | 8/1999 | Brown et al. | |
| 6,338,018 B1 | 1/2002 | Baker | |
| 6,640,773 B1 * | 11/2003 | Ancimer et al. | ............ 123/299 |

FOREIGN PATENT DOCUMENTS

| | | |
|---|---|---|
| CA | 1203132 A | 4/1986 |
| DE | 2148506 A | 4/1973 |
| DE | 4304441 A1 | 8/1994 |
| WO | WO-01/59285 A2 | 8/2001 |

OTHER PUBLICATIONS

International Search Report, PCT/AU03/00272, dated May 27, 2003.

* cited by examiner

*Primary Examiner*—Stephen K. Cronin
*Assistant Examiner*—Hyder Ali
(74) *Attorney, Agent, or Firm*—Connolly Bove Lodge & Hutz LLP (57) ABSTRACT

A system of analyzing engine performance to assist in the improved control of a dual fuel engine includes measuring devices for measuring parameters including engine load, RPM, fuel injected, air inlet temperature, exhaust temperature, oxygen or carbon dioxide levels in the exhaust gases, at discrete time intervals. An electronic storage device stores the data collected by the measuring devices at each of the discrete time intervals, and analysis apparatus analyzes the stored data to establish a data table for each parameter against each measured engine load and RPM point. Imaging software is provided for presenting the data sets for each parameter as a three dimensional surface plotted against load and RPM.

11 Claims, 11 Drawing Sheets

DUAL FUEL ENGINE CONTROL

FIELD OF THE INVENTION

This invention relates to the control of fuel supply in a dual fuel engine of the kind where a primary diesel fuel is supplemented with a gas such as natural gas or propane.

BACKGROUND TO THE INVENTION

The substitution of part of the diesel fuel with natural gas or liquid propane gas [LPG] results in cost savings and improved emissions through better combustion. U.S. Pat. No. 5,224,457 discloses a dual fuel system for a stationary engine. The engine has a diesel injection system controlled by an electronic control unit and a metering valve and mixer which controls introduction of gas into the air intake for the engine. An electronic governor controls the metering valve and a link controller coordinates the ECU and the governor.

U.S. Pat. No. 5,226,396 addresses the problem of varying fuel types and quality of combustion by measuring the oxygen content of the exhaust gases and adjusting the gas supply to the diesel air intake in response to the oxygen content of he exhaust gases. U.S. Pat. No. 6,055,963 discloses a related method in which the oxygen level of exhaust gases as measured is compared to desired exhaust oxygen calculated from engine speed and engine load and then adjusts the energy content value.

U.S. Pat. No. 5,937,800 addresses the problem of varying energy values for added gaseous fuels by establishing a governor out put energy value required and determining energy rates for the diesel and gas fuels as a function of actual and desired engine speed and engine load. U.S. Pat. No. 6,101,986 filed at the same time as U.S. Pat. No. 5,937,800 is concerned with reducing engine speed fluctuations during transition between liquid and dual fuel modes. This is achieved by establishing a desired diesel amount to be added after transition and substituting an amount of diesel with the energy equivalent of gaseous fuel.

U.S. Pat. No. 6,230,683 is concerned with dual fuel PCCI engines and controls the timing of combustion by controlling the amount of gas delivered to the air intake.

U.S. Pat. No. 6,003,478 discloses a dual fuel control system that monitors air intake, diesel intake, exhaust gas temperature and oil pressure. The engine does not shut down when one of the parameters is inadequate but the gas supply can be shut off under no load, low load and excessive load conditions.

U.S. Pat. No. 6,202,601 discloses a system for preventing knocking in a dual fuel engine by monitoring engine load conditions and in high load conditions providing a 3 stage fuel injection. FIG. 1A plots engine load against RPM to determine a flammability limit which is the fuel to air ratio at which the quantity of gaseous fuel will not support stable combustion. In FIG. 1B fuel to air ratios which are considered to be proportional to engine load, are plotted against RPM.

Despite these many attempts gas fumigation of diesel engines has not been widely adopted particularly for automotive engines. The many variables attached to the efficient use of gas in an automotive diesel engine have made it very difficult to devise a practical and economically viable and environmentally advantageous control device.

It is an object of this invention to manage these variables overcome these problems.

BRIEF DESCRIPTION OF THE INVENTION

To this end the present invention provides a gas control system for a dual fuel engine which senses
1 RPM
2 Load
3 optionally throttle position or road speed
4 oil pressure and engine temperature alerts and optionally exhaust temperature alerts
5 operational state of the vehicle and the engine including one or more of cruise control, manual control, braking, idling, cold start and accelerating Most prior art systems did not fully assess the consequences to optimized combustion of the operational state and the change of operational state of the vehicle. Although some switched the gas fumigation off when exhaust temperature or oil pressure exceeded certain predetermined limits they did not consider for example the effect of braking on the emission quality of the exhaust gases.

The major different diesel engine and applications categories to which this invention is applicable to are:
  Constant engine speed stationary applications (gensets).
  Variable engine speed applications, including mobile plant.
  Automotive applications with mechanical fuel control/metering (no electronic engine management system).
  Automotive applications with a basic existing electronic engine management system.
  Automotive applications with an advanced existing electronic engine management system.

In another aspect the present invention provides a method of controlling addition of fuel into a dual fuel engine in which
1. Engines are monitored to develop a set of data of fuel requirements against load and RPM
2. The control system monitors the load and RPM of the engine and comparing these to the stored data determines the appropriate gas substitution.

In a further aspect the invention provides a control system for the substitution of gas for diesel in a dual fuel diesel engine which includes
  a) means to sense RPM
  b) means to sense Load
  c) storage means for a set of data of fuel requirements against load and RPM;
  d) a control system which monitors the load and RPM of the engine and comparing these to the stored data determines the appropriate gas substitution.

Engines are mapped, preferably using dynamometer bench tests and emissions test equipment, to identify the operating characteristics of the engine across the load/RPM range and the possible fuel substitution percentage range. The instantaneous values of operating characteristics such as fuel consumption, thermal efficiency, emissions and combustion temperature may be recorded at discrete points across the load/RPM/substitution ranges. The outcomes are preferably presented as three dimensional data sets of diesel only and dual-fuel fuel requirements against primary input parameters of load and RPM for each engine family and configuration. These data sets represent control points on three dimensional characteristic surfaces. These characteristic surfaces may be developed for all relevant operating parameters for the engine. In addition, secondary input parameters that may influence the operation of the engine may be taken into account. Secondary variable input parameters include inlet air temperature and humidity and barometric pressure, and secondary constant input parameters include fuel type, compression ratio, bore and stroke. In this invention the preferred method during mapping is to hold the set of secondary input parameters constant while varying both load and RPM. These variations may be made in steps that are each defined as an ordered pair of values. Any output parameter can be collected for each load/RPM pair set. Useful output parameters to collect include fuel consumptions and emissions such as particulate emissions, carbon dioxide or monoxide emissions for each measured load/RPM point. These data sets may be analyzed, using a variety of tools and methods, including linear programming and simulated annealing, to identify, across the RPM/load range, two derived data sets of diesel and gas fuel flow rates that achieve the optimum dual-fuel economic and environmental outcomes while reducing, maintaining or increasing (as required) the power that the engine would have generated operating on diesel only. Environmental outcomes include maximizing reductions in emissions such as Carbon Dioxide, Oxides of Nitrogen and Particulates, while minimizing any increases in Carbon Monoxide and Hydrocarbons. This is an improvement for both stationary and automotive diesel engines.

These two data sets of optimized diesel and gas fuel flow rates, across the RPM/load range, may be converted into functional approximations of flow rates, and these are programmed into the invention's control unit. These functional approximations may take the form of piece-wise, bi-linear or bi-cubic interpolations.

This invention's control system continually monitors the engine RPM and commanded fuel delivery rate, derives load, and combines RPM and load values with the programmed fuel flow rate functional approximations, to determine the appropriate gas and diesel flow rates.

The control system commands the engine's fuel pump or existing electronic engine management system to supply the required diesel flow rate. Simultaneously, the control unit commands the gas flow valve or injector/s to supply the required gas flow rate into the air inlet of the diesel engine. So the optimum amounts of diesel and gas are delivered for the particular conditions of the vehicle and engine at all times. The invention's control system does not replace an existing electronic engine management system but, for example, provides it with a modified signal which maintains or reduces the engine management system command to the diesel injector so that the identified required diesel flow is provided by the injectors. Where the engine has a mechanical fuel control system, the invention's control system intercedes between the throttle and the diesel fuel injection pump to command the identified required modified diesel flow rate. The invention's control system supplies the identified required gas flow by commanding the gas flow valve to vary the cross sectional area of its opening to the programmed setting. If a gas injector or injectors are used, the control system commands a specified variation in the injector/s pulse duration. If the sequential multi-point injection option is selected for gas delivery, the control system varies the timing of operation of the gas injectors so that gas is delivered to the immediate proximity of the air inlet to each cylinder coordinated with the opening of the air inlet port, and the closing of the exhaust outlet port for that cylinder to minimize the amount of gas passing unburned through the cylinders during the scavenging process.

In another aspect this invention provides a system of analyzing engine performance to assist in the improved control of the engine which includes
  a) measuring devices for measuring parameters including engine load, RPM, fuel injected, air inlet temperature, exhaust temperature, oxygen or carbon dioxide levels in the exhaust gases, at discrete time intervals
  b) electronic storage means for storing the data collected by the measuring devices at each of said discrete time intervals
  c) means to analyze the stored data to establish a data table for each parameter against each measured engine load and RPM point.

This is the basis of analyzing engine performance and the basis for improving performance.

In another aspect this invention provides an information feedback system that acquires key engine and application operating parameters. This information may be fed back immediately to the operator to assist in the improved control of the engine, and/or sampled at discrete time intervals and stored for later download and analysis. The information feedback system includes:
  a) A data acquisition sub-system, where data is obtained from existing or installed sensors and/or the existing engine management system. Relevant operating parameters include engine/vehicle operating state, RPM, road speed, diesel fuel supply and return, gas fuel supply, air inlet temperature, exhaust temperature, oxygen or carbon dioxide levels in the exhaust gases.
  b) A non-volatile electronic storage means for storing the collected data at discrete time intervals.
  c) A display device and/or, where appropriate, audio/tactile devices options to provide immediate feedback of selected parameter values to the operator.
  d) A feedback sub-system option that enables a remote authorized observer to establish a connection to the data logging system and request real-time displays of selected parameters.
  e) A means to download stored data at regular or as required intervals to a web server or computer via a land or mobile telephone link, a point to point cable or a removable storage device.
  f) A data analysis and reporting sub-system to process and visualize the stored data.

The data produced by the information feedback system may be analyzed to identify the overall performance of the engine/vehicle, including identifying emissions and transforming logged drive cycle data into load profile form where the time spent at all engine load/RPM points is plotted using, for example, histograms or frequency polygons/polyhedrons.

Outcomes of this analysis process may include comparative load profiles and drive cycles and predicted optimum operating conditions. Comparisons may also be made for the fuel consumptions and costs and emissions levels had the same job been done operating on diesel only.

Visualizing software may be used to present the data sets for each parameter as a 3 dimensional surface plotted against load and RPM. The information can also be used to identify ways to improve the driver's control of the vehicle to conserve fuel and reduce unwanted exhaust emissions.

BRIEF DESCRIPTION OF THE FIGURES

Preferred embodiments of the invention will be described with reference to the drawings in which.

DETAILED DESCRIPTION OF THE INVENTION

A preferred application of this invention is to diesel engines in stationary or automotive applications. This invention enables optimized operation of these engines in dual-fuel mode by introducing a gas, usually propane gas or natural gas, into the air charge to the diesel engine to substitute for part of the diesel fuel.

Figure 1:
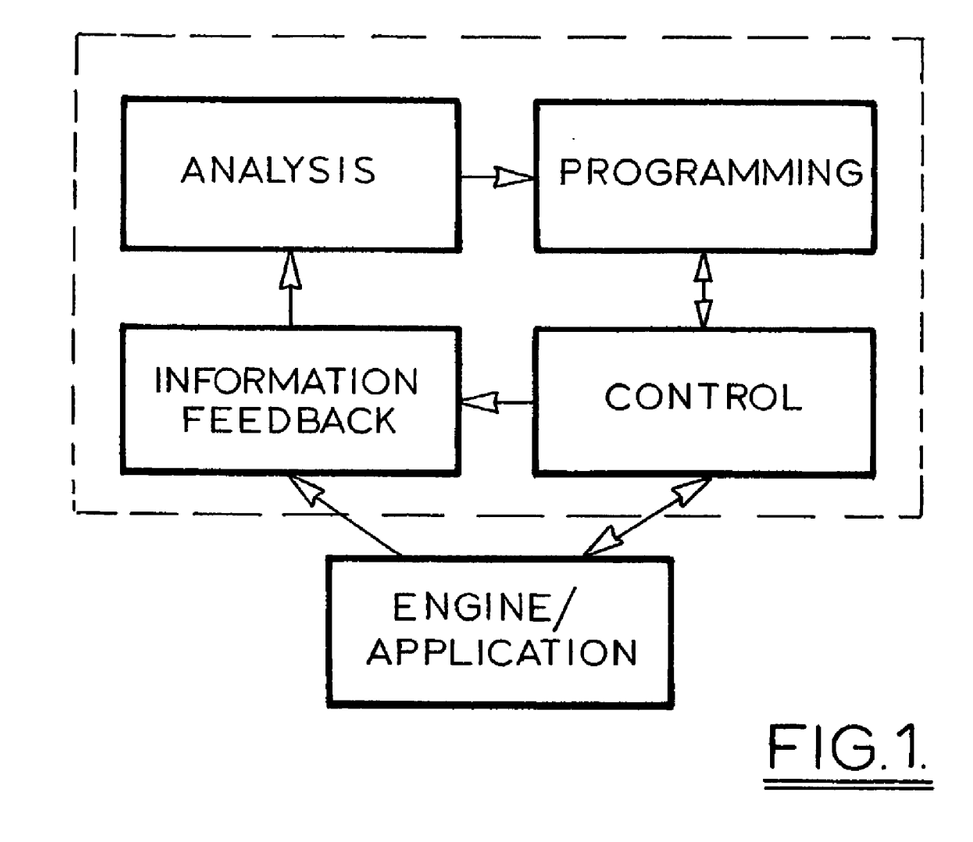
FIG. 1 is a top level system diagram of the engine fuel management system (EFMS) provided by this invention.

As shown in FIG. 1 the system of this invention contains four linked systems, each of which has sub-systems. The four systems are:

A Control System.
An Information Feedback System.
An Analysis System.
A Programming System.

This invention uses a Control System that continuously controls an amount of propane or natural gas to be added, and an amount the diesel supply is to be reduced, to achieve an optimum reduction in weighted greenhouse gas ($CO_2$ Equivalent) and other emissions, and to maximize operating economic savings without compromising operating performance parameters.

The Control System of this invention may direct (master), or be directed by (slave) the relevant parts of an existing engine management system, or may manage the fuel substitution processes (stand alone) where there is no engine management system installed.

This invention uses an Information Feedback System that records and/or displays measured and/or derived representations of current and historical engine and application operating parameters, including fuel consumption and emissions data, to assist application operators to view and measure current performance and to implement and evaluate actions to achieve improvements.

This invention uses an Analysis System to identify, for each engine family, across total load and RPM ranges, the diesel only and dual-fuel operating characteristics and optimum emissions and fuels consumption results and comparisons. This system also identifies application information such as load profiles or drive cycles and may store and report on multiple/individual application historical performance.

This invention uses a Programming System that contains a library of default Control System operating parameter programs, created by the Analysis System, for each different engine family. A default program is downloaded into the Control System and is customized for each individual engine/application to achieve optimum economic and/or environmental performance across the entire load/speed range.

The Control System used in this invention interacts with major existing diesel engine and application systems and processes, including engine management systems, sensors, governors and throttle controls.

Figure 2:
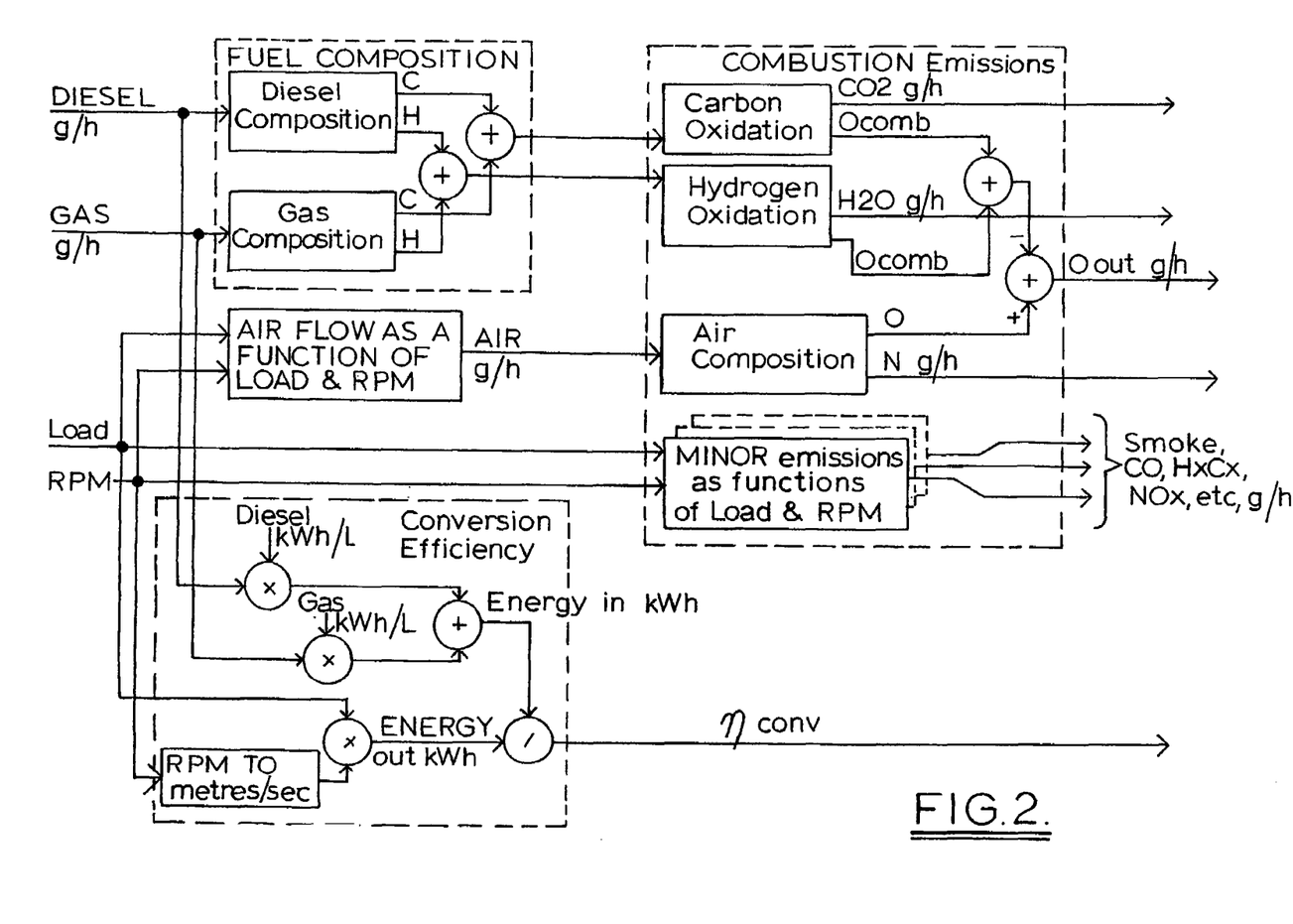
FIG. 2 is a hybrid model diagram of the system for modeling combustion and deriving emissions and efficiency for all engines and applications.

The Control System uses one hybrid method illustrated in FIG. 2, to model combustion and to derive emissions and efficiency for all engines and applications. Major emissions are calculated using elementary combustion equations, and minor emissions, fuel consumption and efficiency are derived from empirical functional approximations.

The Control System uses different sub-system configurations to interact with the major different types of existing diesel engine control and energy input systems, and uses different methods for obtaining the instantaneous load value. The major different diesel engine and applications categories to which this invention is applicable to are:

Constant engine speed stationary applications (gensets).
Variable engine speed applications, including mobile plant.
Automotive applications with no existing engine management system.
Automotive applications with a basic existing engine management system.
Automotive applications with an advanced existing engine management system.

For constant engine speed stationary applications (gensets), the engine's constant speed governor continuously compares the engine speed against a reference set point. As load increases or decreases, the tendency is for the engine speed to drop away from, or to try to exceed, the set point until the fuel delivery rate is adjusted. This governor increases the fuel delivery rate if the engine speed is below the set point, and decreases the fuel delivery rate if the engine speed is above the set point.

Figure 3:
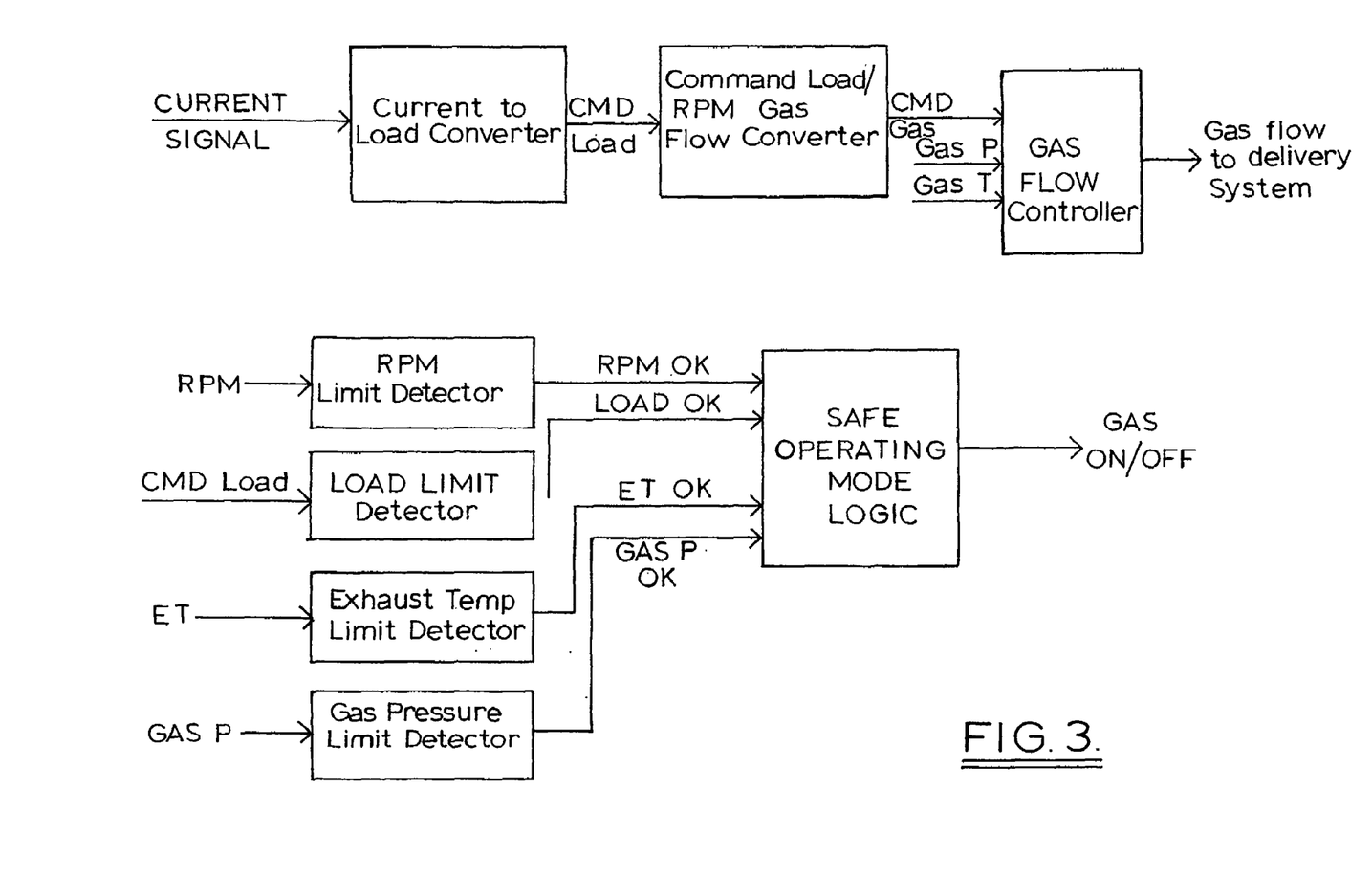
FIG. 3 is a system diagram for a gas addition system of this invention for use with a constant engine speed stationary engine.

As shown in FIG. 3 this invention's Control System measures the genset output current to derive load. The genset's output voltage will be constant, but the output current will vary across the load range. Genset output power is the product of voltage and current. Since voltage does not vary, it is effectively the proportionality constant that relates current to power (neglecting alternator etc losses and power factor variations). This invention's Control System uses this relationship, and the application's specification data, to derive instantaneous load. Depending on the percentage load, the Control System introduces the pre-programmed volume of gas to the air inlet. This volume of gas is calculated to replace part of the energy content formerly supplied by the diesel fuel, as a function of output load. As diesel is always being supplied to an operating engine, the existing governor always provides the fine control of fuel flow in response to engine speed. The combustion of gas produces additional energy, so the engine tends towards increasing speed. The governor detects this tendency, and decreases the diesel fuel flow until the engine is back on the set point. As output load varies, both the diesel and gas flows vary in response.

For variable engine speed applications, including marine applications and mobile plant such as earthmoving equipment, tractors and wharf straddles, there are two main classes, those applications with and without engine management systems.

Figure 4:
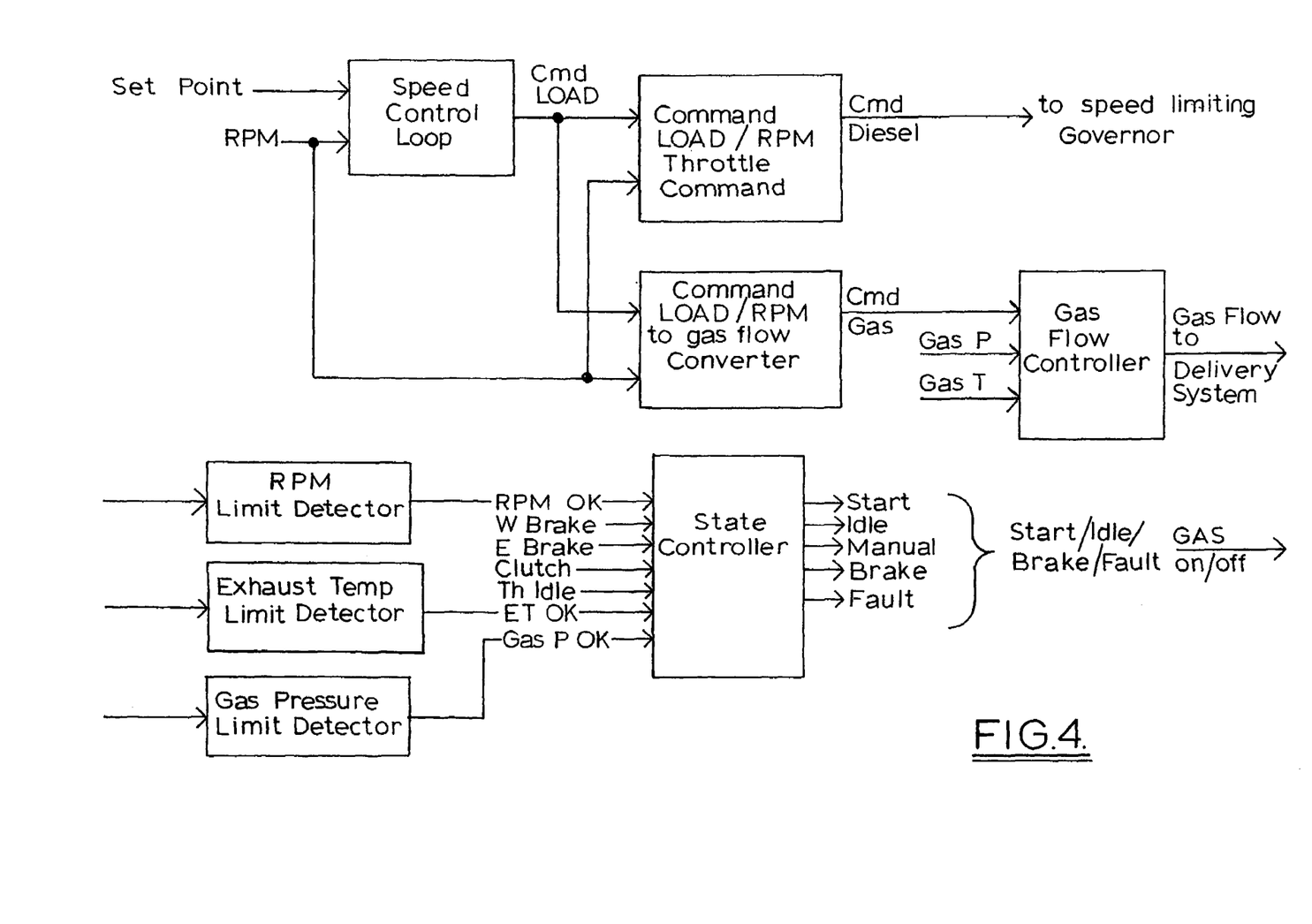
FIG. 4 is a system diagram for a gas addition system of this invention for use with a variable engine speed application with a mechanical fuel control/metering system.

As shown in FIG. 4, for variable speed applications without an engine management system, the existing governor maintains engine speed to the presently selected set point at any point on the operating RPM range by increasing or reducing the diesel fuel flow rate.

This invention replaces that governor with a speed limited governor, and a speed control loop. The replacement governor has a throttle input that the invention's Control System adjusts to achieve the calculated required diesel flow rate to supplement the pre-programmed gas flow rate for that RPM setting. Load is derived as a function of size of the error between the engine speed and the presently selected set point engine speed.

For variable speed applications with an engine management system, this invention controls gas and diesel supply and identifies load in much the same ways as those used for automotive applications with an engine management system and operating in cruise control mode which is described below in relation to FIG. 6.

For automotive applications with mechanical fuel control/metering, this invention uses existing or, as required, installed sensors, and the Control System incorporates signal conditioning units that process the following engine and application input signals:
 Road speed
 Exhaust temperature
 Wheel brake
 Engine brake
 Clutch
 Set, resume coast and accelerate for cruise control
 Gas pressure and temperature
 Engine RPM
 Throttle position This invention's Control System contains a varying number of Limit-Detectors, and the safe operating thresholds for each detector are pre-programmed for each engine and application. Typically, Limit-Detectors are required for:
 Road speed
 Exhaust temperature
 Gas pressure
 Engine RPM If any threshold is exceeded, the Limit-Detectors send a no-go signal to the State-Controller sub-system in this invention's Control System.

This State-Controller sub-system accepts signals from the Limit-Detectors and other input signals such as wheel brake, engine brake, clutch and set and resume cruise. The State-Controller uses this information to determine the current operating state of the engine/vehicle. The set of possible operating states is:
 Start
 Idle
 Manual
 Cruise
 Brake
 Fault The outputs from the State-Controller are sent to, and are used by, a number of different sub-systems, as shown in the attached system diagram.

The existing mechanical throttle linkage to the automotive governor is replaced by an electronic linkage system that incorporates a throttle position sensor, a Throttle-Signal-Processing-Chain (which is a sub-set of this invention's Control System) and a motorised throttle actuator.

Figure 7:
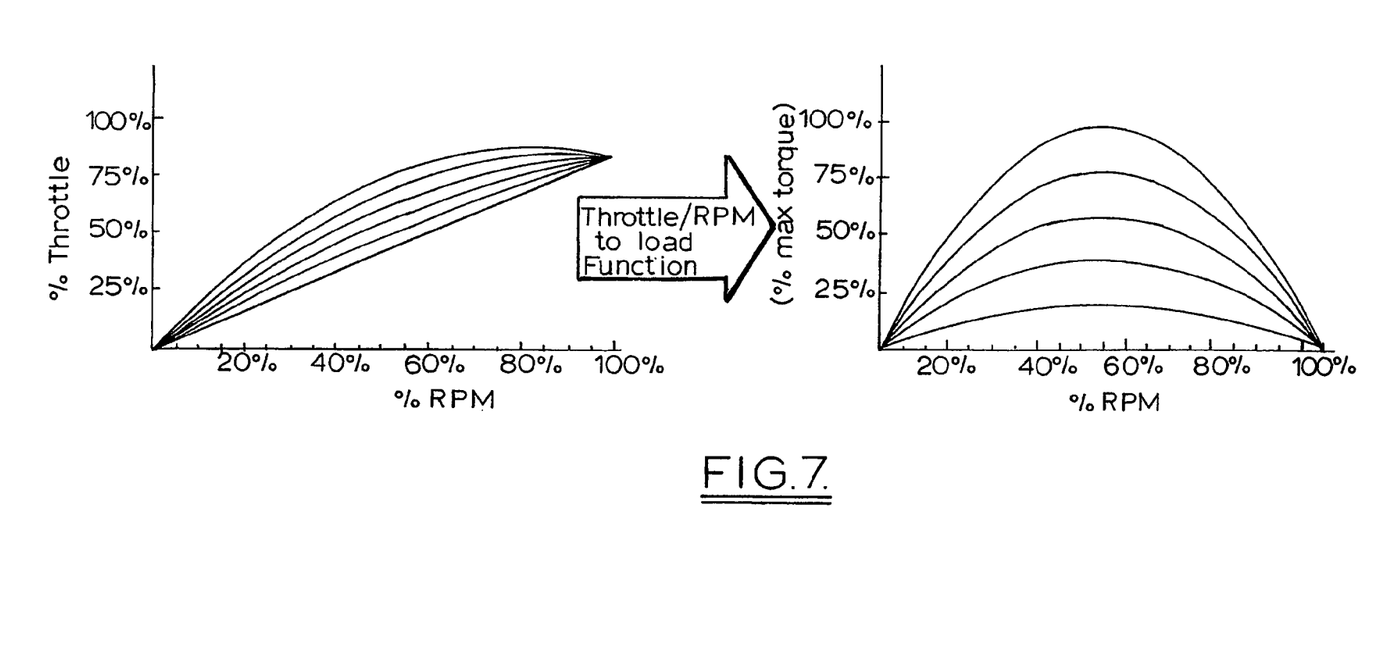
FIG. 7 is a throttle/RPM to load diagram used in deriving engine load.

The Control System includes a Throttle/RPM-to-Load-Converter sub-system that uses a generic functional model and any specific parametric modifications that may have been identified and programmed for that specific engine and application. This is shown in FIG. 7 where throttle is shown as a % of the movement from no throttle to full throttle and RPM as a % of the change in RPM from low idle to high idle. For any given engine speed, the engine load can be derived by identifying the displacement of the throttle from the no-load position towards the full load position.

This invention's Control System contains a Cruise-Controller sub-system operating option for these engines when they are operating in dual-fuel mode. This sub-system is a proportional/integral/derivative (PID), fuzzy logic, adaptive or other control loop that compares the current road speed with the previously set cruise speed and generates a cruise load error signal.

The Control System contains a Negative-Load-Controller sub-system (see FIG. 5) to direct the engine brake to operate when the engine/vehicle is in cruise operating mode and road speed is in excess of the cruise set speed.

The Control System also contains a Load-Transition-Interpolator sub-system to manage the smooth transition between manual and cruise operating modes. The present operating mode (manual or cruise) is signalled to the interpolator by the State-Controller. The interpolator processes manual and cruise load signals and produces a Requested-Load signal and forwards that signal to the Requested-Load-Rate-of-Change-Limiter sub-system.

This Limiter sub-system processes the requested load signal and produces a Command-Load signal, whose rate of change does not exceed the identified and pre-programmed load step response time for any relevant engine output parameter.

The core of this invention's Control System as shown in FIG. 4 resides in the following two sub-systems, which utilize the same input signals and internal processes, but are programmed with different operating data. The Command-Load/RPM-to-ECU-Throttle-Converter sub-system and the Command-Load/RPM-to-Gas-Flow-Converter sub-system provide as outputs the Command-Diesel and the Command-Gas flow signals. Typically these output signals are bivariate interpolated functional approximations of engine RPM and Command-Load. The approximations are arrived at by referring to a pre-programmed two dimensional grid of command values, with grid axes of the load and RPM independent parameters [see FIG. 8]. This enables the Control System to identify, and to generate flow commands for, the optimum gas and diesel flow rates for every possible combination of load and RPM values across that engine's operating range.

Figure 5:
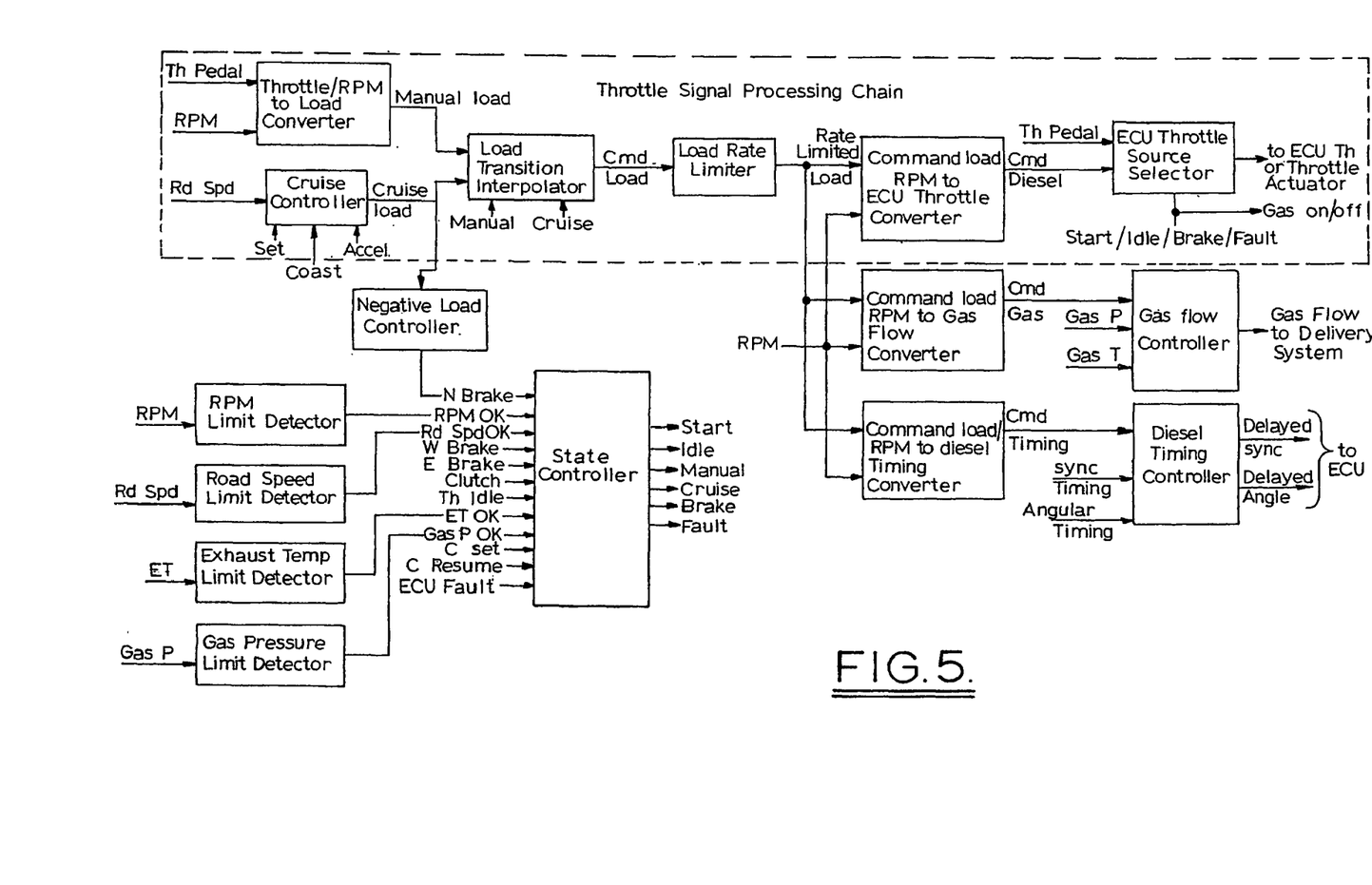
FIG. 5 is a system diagram for a gas addition system of this invention for use with an automotive engine with mechanical fuel control/metering or a basic existing electronic engine management system.

As shown in FIG. 5 the Command-Diesel flow signal is sent to the ECU-Throttle-Source-Selector sub-system, which, depending on the present engine/vehicle operating state, selects either the raw throttle pedal signal or the Command-Diesel signal and forwards it to the throttle actuator.

The Command-Gas flow signal is sent to the Gas-Flow-Controller (see FIG. 5), which compensates for any changes in gas density by identifying the current gas temperature and pressure, and identifies and signals the required gas flow rate to the valve or injector controller in the gas flow delivery system.

For automotive applications with a basic existing electronic engine management system (see FIG. 5) this invention's Control System uses any relevant measured or derived information that can be accessed from existing engine and vehicle sensors rather than installing the sensors as listed above for automotive applications with mechanical fuel control/metering.

If the vehicle has an existing cruise control system, this invention's Control System overrides that cruise control system with its own Cruise-Controller sub-system when the engine is operating in dual-fuel mode.

The only other major change from the process detailed above is that the Throttle-Signal-Processing-Chain Control System sub-set is inserted into the existing electronic linkage system, between the existing throttle position sensor and the ECU.

Figure 6:
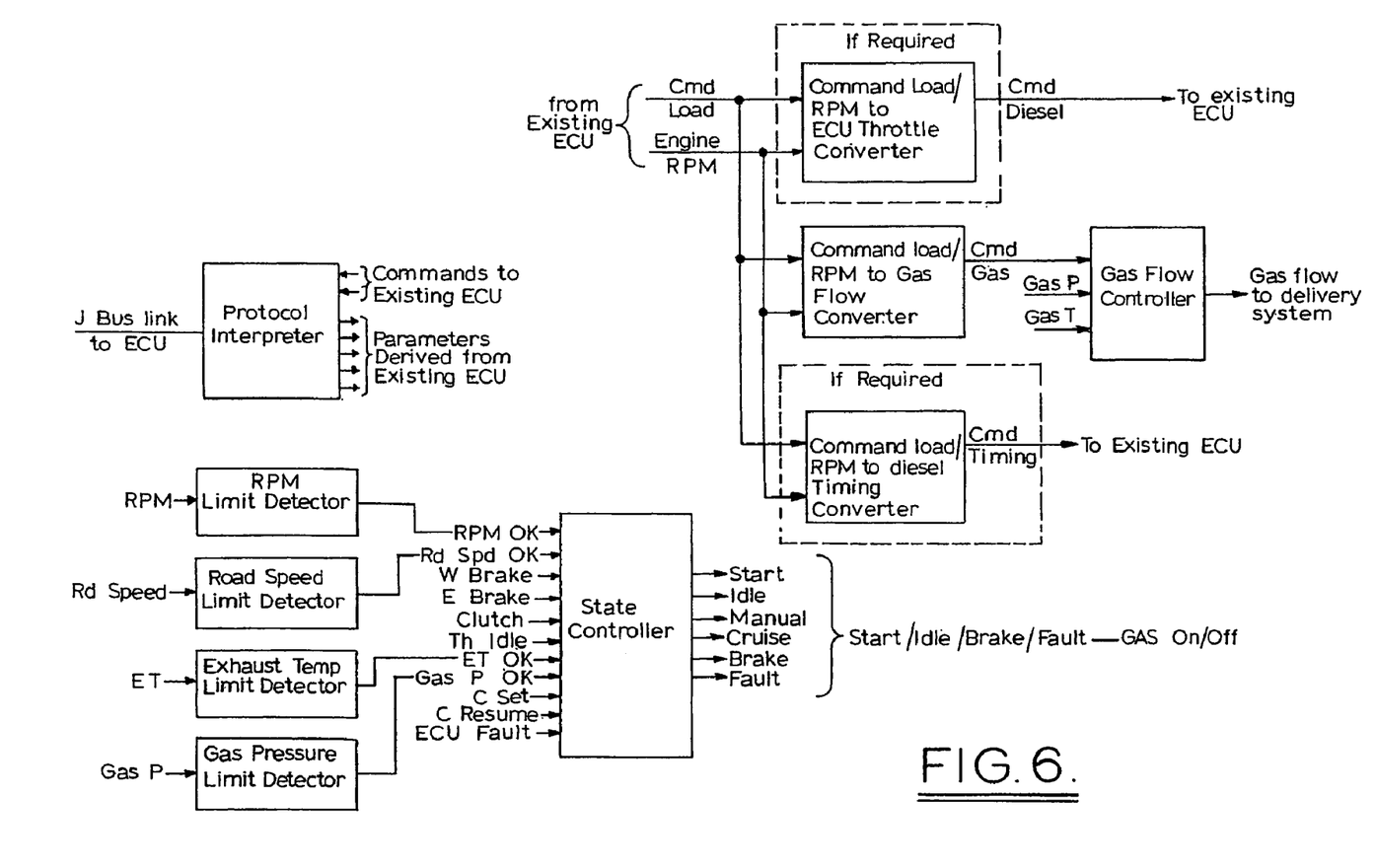
FIG. 6 is a system diagram for a gas addition system of this invention for use with an automotive engine with an advanced existing electronic management system.

As shown in FIG. 6, for automotive applications with an advanced engine management system this invention's Control System uses any relevant measured or derived information that can be accessed from the existing engine management system ECU, rather than installing the sensors as listed above for automotive applications without an engine management system, or accessing the existing signals as discussed in the section on basic existing electronic engine management systems.

To gain access to required information available from an advanced ECU, this invention's Control System uses an industry standard J Bus or other suitable interface between the ECU and the ECU-Protocol-Converter sub-system (see FIG. 6).

The ECU-Protocol-Converter is unique to Control Systems interfacing with advanced engine management systems. It enables this invention's Control System to send and receive messages and to interrogate the existing ECU to access and modify required existing ECU parameters and signals. It also converts message and parameter data into the formats, ranges and units required by the Control System and the ECU.

The information for operating limit detections and engine/vehicle operating state identification is now largely obtained from the ECU-Protocol-Converter rather than by using the direct input signal method outlined above.

This invention's Control System accesses the existing ECU command load and engine RPM parameters and uses that data to determine the Command-Gas output signal, and to determine required gas flow using the methods detailed above.

The Control System interfaces with the existing ECU to change the diesel delivery flow rate by the appropriate amount. When the engine is operating in diesel-only mode, the existing ECU uses its default diesel only delivery flow rate. When the engine is operating in dual-fuel mode, the Control System usually directs the ECU to calculate the appropriate reduction in diesel flow rate. If that ECU cannot do this, the Control System directs the ECU to vary the diesel flow rate by the amount calculated by the Control System Command-Load/RPM-to-ECU-Diesel-Delivery-Converter sub-system. This sub-system is almost identical to the Command-Load/RPM-to-ECU-Throttle-Converter sub-system detailed above.

If the vehicle has an existing cruise control system, it is still completely managed by the existing ECU.

Figure 9:
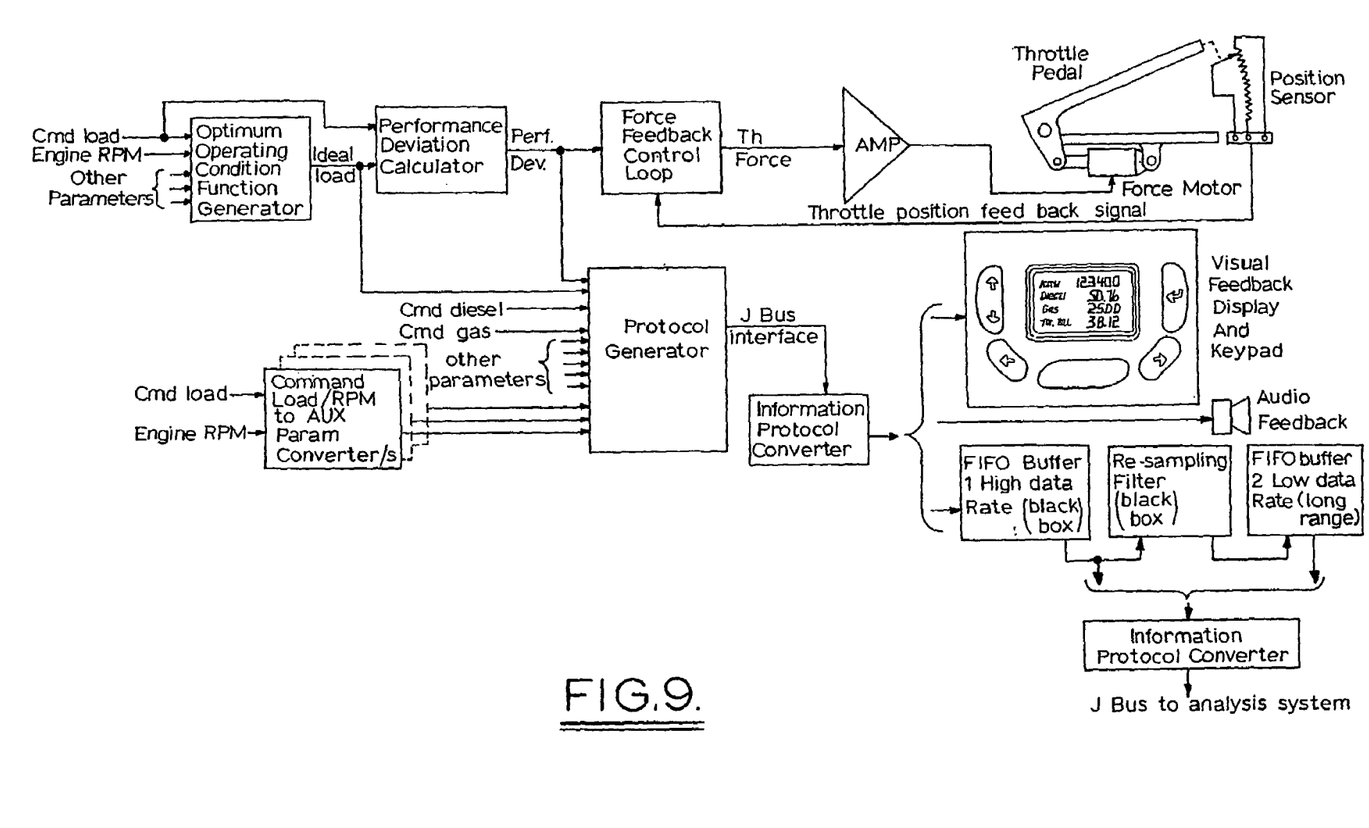
FIG. 9 is a system diagram for the information feedback system shown in FIG. 1.

This invention's Information Feedback System is illustrated in FIG. 9 and interfaces with the Control System, and contains its own sub-systems as detailed below. It provides an engine operator or a vehicle driver with the capacity to immediately identify inefficient operation and to modify the appropriate operating behavior. The system provides immediate visible feedback of present economic and emissions performance that may be supplemented by tactile or audible feedback.

The visible feedback indicator for each parameter is selected and displayed on a screen as a bar or dial indicator or a graph. Audible feedback may use variable amplitude, frequency and pulse duration signals to indicate the degree of deviation from optimum performance for selected operating parameters. Tactile feedback for automotive applications is provided by progressively increasing the resistance to throttle movement to indicate the degree of divergence from optimum performance.

In addition to this immediate feedback, the Information Feedback System also records designated and/or selected parameters into a non-volatile memory for both immediate display of historical performance and download by a standard cable or modem for remote and off-line historical performance analysis and reporting.

Chosen parameters may be recorded to memory at standard or designated time intervals. The recording system memory is structured as two linked First-in-first-out (FIFO) buffers or stacks. The last hour of operation is recorded at a high sample rate, say once every second, into the first buffer, and data for previous hours/days/weeks is recorded at a lower sample rate, say once every one to fifteen minutes, into the second buffer.

The output of the first buffer is filtered (using convolutions, weighted averages or other relevant digital signal processing techniques) and re-sampled into the second buffer at a much lower data rate. The short period of high sample rate may constitute a detailed "Black Box" record, and the extended period of low sample rate produces a data log of operating parameters for the engine and application.

The Information Feedback System contains a set of Command-Load/RPM-to-Auxiliary-Parameter-Converters which receive Command-Load and engine RPM signals. These converters use empirical and/or theoretical pre-programmed models to describe any required auxiliary parameter. Options include identified or all emissions, fuel consumption, thermal efficiency, inlet air flow, torque and power. These auxiliary parameters are not required for fuel control processes, but are used by the Information Feedback, Analysis and Programming Systems for performance feedback, optimization, monitoring, reporting and analysis and programming.

If the option to provide immediate feedback to the operator is enabled, the Optimum-Operating-Condition-Function-Generator sub-system receives Command-Load, Command-Diesel and Command-Gas sub-system signals, and auxiliary parameter signals such as thermal efficiency and emissions. This generator uses an objective function to generate an Ideal-Load output signal and sends that signal to a Performance-Deviation-Calculator sub-system.

The Performance-Deviation-Calculator sub-system generates a Performance-Deviation output signal by calculating the difference between the Ideal-Load and actual Command-Load input signals. This output signal is sent to the Force-Feedback-Control-Loop and to the Information-Protocol-Converter.

The Force-Feedback-Control-Loop sub-system compares the throttle pedal signal against the Performance-Deviation signal and generates a Force-Feedback signal that operates a torque motor in the throttle pedal assembly. The motor causes the force required to depress the throttle pedal to increase proportionally to the degree of deviation of present performance from the optimum, thus providing Tactile Feedback to the driver.

The Information-Protocol-Converter sub-system receives signals from the Auxiliary-Parameter-Converters, the ECU-Protocol-Converter and other Control System input and intermediate signals, and/or application sensors. The Information-Protocol-Converter formats signal values and makes them available to the display and recording sub-systems of the Information Feedback System, using an industry standard J Bus or other appropriate interface.

Figure 10:
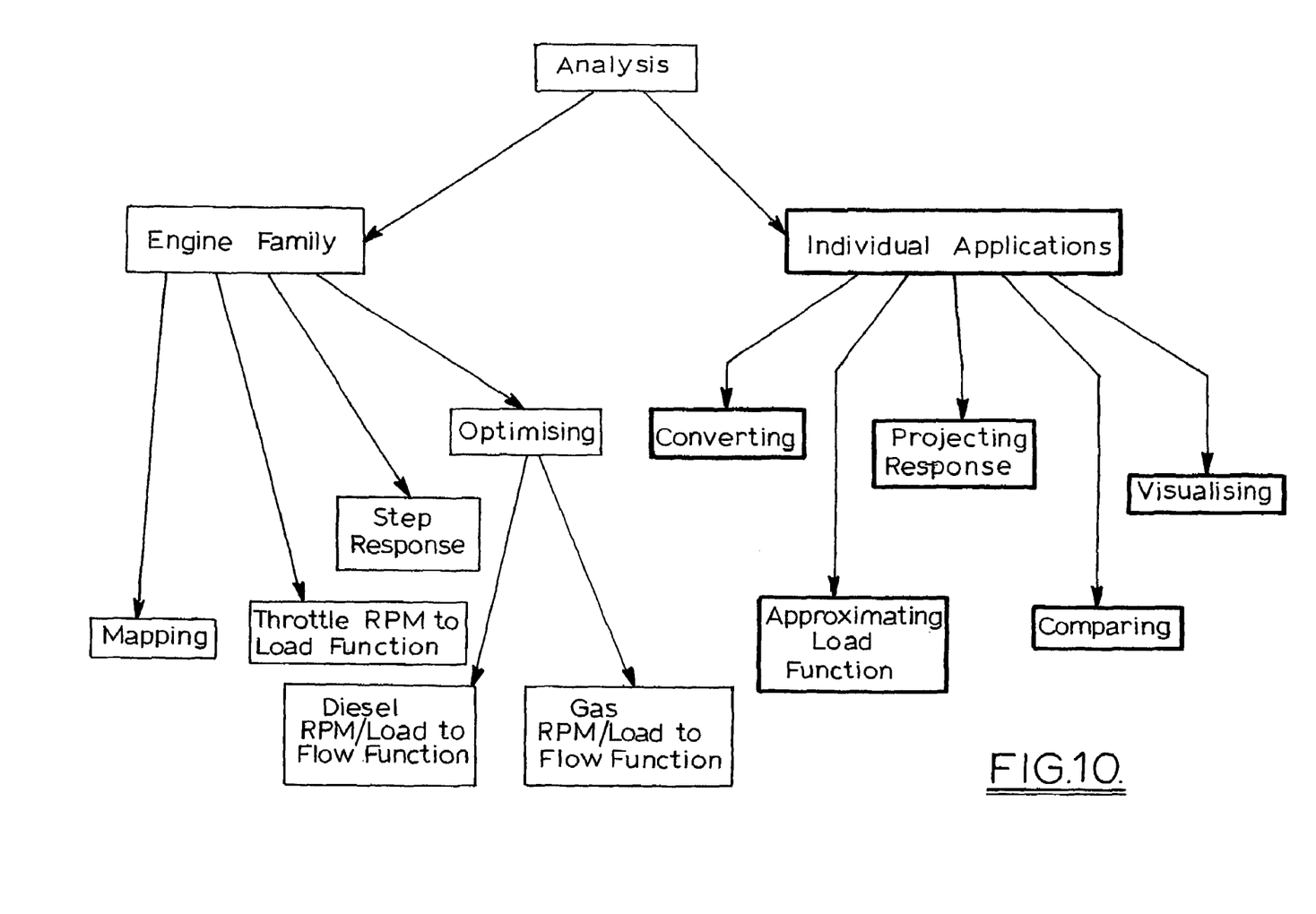
FIG. 10 is a top down system diagram for the analysis system shown in FIG. 1.

If the option to provide immediate real-time operating data to remote observers is enabled, the observer may connect to the information feedback system via a modem/land line/wireless/internet link and request real-time operating data to be sent. This enables remote observers to view selected parameters, perhaps comparing outcomes from different engine/application operating conditions. This invention's Analysis System shown in FIG. 10 contains sub-systems that facilitate the following major processes for engines and applications:

For an engine family:
Mapping.
Throttle/RPM-to-Load-Function.
Step Response.
Optimising Economic and Environmental Performance.
For individual applications:
Converting historical operating data into statistical graphs or surfaces.
Approximating historical performance.
Projecting performance.
Comparing performance.
Visualizing and Reporting.

The operation of a diesel engine can be characterised in terms of two primary independently varying operating input parameters, load and RPM. Each engine family is mapped by testing diesel-only and dual-fuel operation using a grid of at least 36 key points across the total load/RPM range.

A group of secondary input parameters influences the operation of the engine. Secondary parameters fall into two sub-groups, variables and constants.

Examples of secondary variable parameters are gas temperature and pressure, ambient temperature and humidity and barometric pressure, and these are measured and recorded throughout test activities. Examples of secondary constant parameters are fuel specifications, compression ratio, bore and stroke, and these are obtained from manufacturers' data.

A tertiary input parameter, required to characterise the engine in dual-fuel mode, is the % of gas substituted for diesel fuel to achieve optimum economic and environmental outcomes. The gas flow rate is held constant while the engine is tested at each of the 36 or more key points, and the engine output parameters are measured and recorded at each key point.

Output parameters include fuels consumption, emissions, engine and exhaust temperature, inlet air flow, power and manifold absolute pressure. This test process is repeated across the range of gas flow rates that can be provided at each key point without exceeding defined engine operating parameters such as peak pressure and exhaust temperature.

This invention's Analysis System takes the sets of key tabular test data and processes these tables by fitting appropriate mathematical functions to each data set. Then, the primary and tertiary variables and secondary variables and constants become the independent parameters to those mathematical functions. The engine output parameters then become the dependent parameters, or outputs of the mathematical functions.

Figure 8:
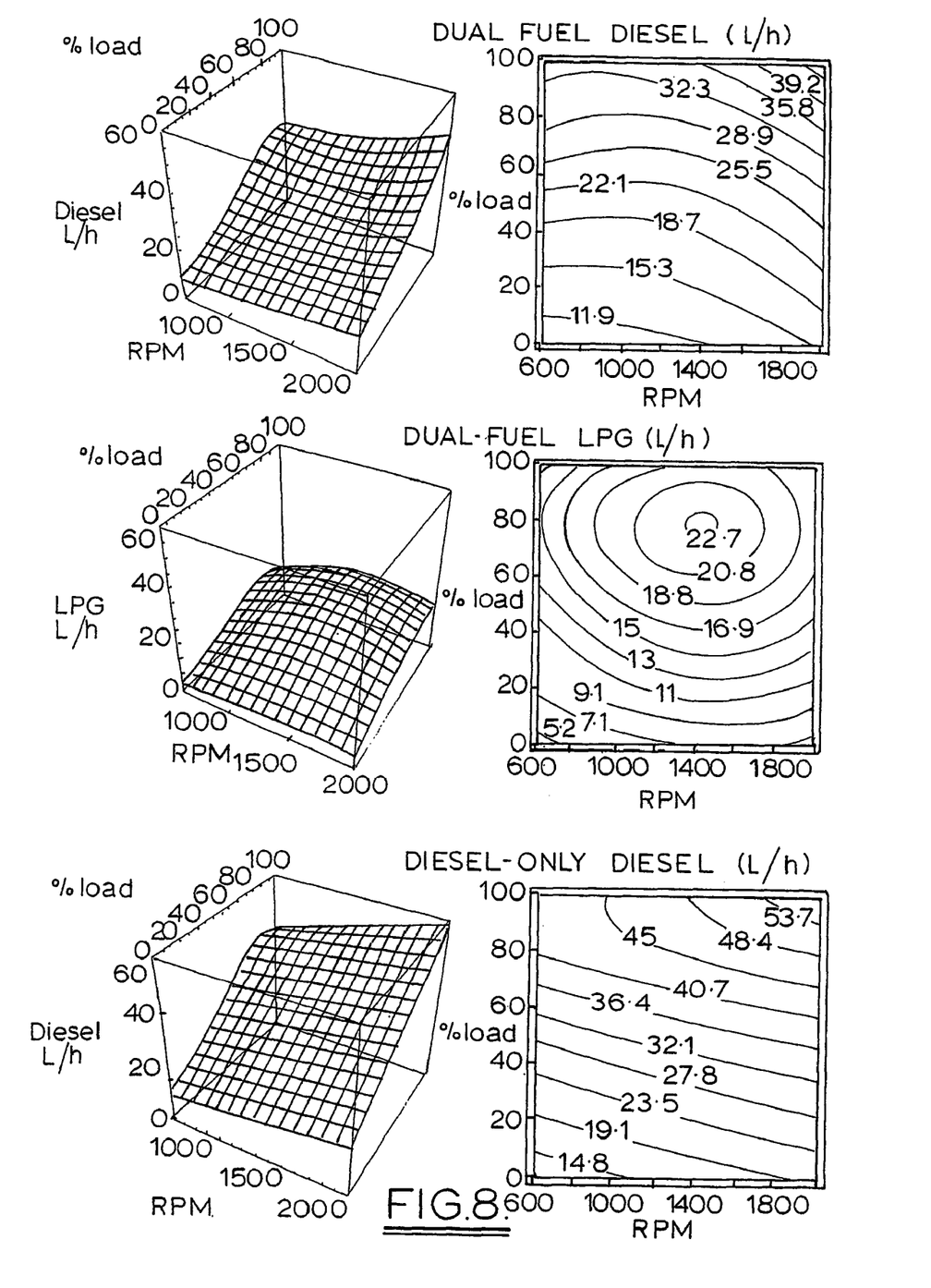
FIG. 8 is an illustration of RPM/load to fuel flow diagram used in determining gas substitution.

The outcome is a set of functional approximations that is capable of describing or interpolating listed engine output parameters for any load/RPM/fuel-makeup combination (see FIG. 8). These approximations can be seen as a series of three dimensional (3D) graph sets, where load and RPM comprise the horizontal x and y-axes of a 3D surface graph, the vertical displacement of the surface indicates the given output parameter and there are individual key surfaces for each of the test series of gas substitution percentages. The outcome of engine mapping is to be able to generate functional models that characterize the listed parameters for any tested engine family.

In addition, the engine mapping process includes a further diesel only test to measure and record, in tabular form, the relationships between throttle displacement, RPM and engine load. This invention's Analysis System uses a special analytical tool to generate a Throttle/RPM-to-Load function.

There is also a separate test, in diesel only and dual-fuel modes, to measure and record the engine's output parameters to identify engine behavior in response to a sudden change in load. The Analysis System uses a special analytical tool to identify the step response time constant for each of the engine's output parameters.

This invention is unique in that it identifies the best possible balance of environmental and economic outcome targets that a mapped engine running in dual-fuel mode could achieve at all load/RPM points. This invention calculates, and controls delivery of, the appropriate amounts of diesel and gas to achieve that optimized performance. So the required fuel flows for any and every load/RPM point are calculated by working backwards from optimized environmental and economic outcome targets.

When identifying optimized performance, this invention takes account of the fact that dual-fuel and diesel only combustion processes are different. Emissions outcomes are quite different for the same load/RPM point in the two modes. Total fuels use across the load/RPM range do not always contain the same energy content. At low loads, dual-fuel mode may use more fuel (reduce thermal efficiency), and produce more of some emissions than diesel only operation. At intermediate and high loads dual-fuel operation results in substantial reductions in some emissions and, on occasion, increases in thermal efficiency. A simple substitution model cannot effectively calculate the varying gas and diesel flows required to manage dual-fuel operation across the load/RPM range, because the relationships between engine outputs and inputs are not simple.

This invention's diesel and gas delivery rates are completely adjustable across the load/RPM range, and are programmed into the Control System for each engine family. These adjustable rates enable this system to calculate and deliver the required fuel flows to achieve the identified optimized environmental and economic outcomes.

This invention's Analysis System takes the data and processed results of the Engine Mapping processes and uses formal optimizing techniques that use a customized Objective Function to find the optimum balance between fuel consumption and listed emissions and therefore identifies the optimum % gas substitution for that engine family across the load/speed range.

This Objective Function may be varied to reflect different economic and/or emissions scenarios. The Objective Function may also incorporate customized rules such as a constraint for any objective parameter (such as a particular emission). The resulting optimized functions are approximated, usually as bivariate Command-Load/RPM-to-Fuel-Flow functions for diesel and gas.

For variable speed and automotive applications, this invention's Analysis System transforms historical time based operating data obtained from the Information Feedback System into a 3D statistical surface (see FIG. 8) that exists in the same load/RPM/Parameter space as the engine mapping process functional models are defined in. The Z axis of the statistical surface is the % of time that the engine spends at any point on the (X,Y) grid of load/RPM ordered pairs.

For genset applications RPM is considered to be constant, so a two dimensional statistical graph of time and load is produced.

The Analysis System applies these statistical graphs or surfaces to the mapped engine functional models to arrive at an approximation of historical performance. Performance may be projected by applying any appropriate statistical load/RPM graph or surface to the mapped engine functional models to:
- Extrapolate future dual-fuel economic and environmental performance for a particular application operating under similar conditions to those in existence during recording of the historical data.
- Estimate hypothetical dual-fuel performance for a particular application if it was operating under any of a defined range of statistical surfaces or load profiles.
- Estimate for a period of dual-fuel operation what the diesel only operation environmental and economic outcomes would have been for that historical period under the same conditions.
- Estimate what the dual-fuel operation environmental and economic outcomes would be by applying historical diesel only operating data such as load, RPM, and fuel consumption for that application to stored functional models of a similar engine.

The Analysis System uses a variety of analytical tools to compare created statistical graphs or surfaces. Comparisons may be made between the performance of a particular application in diesel only and dual-fuel modes, or applications may be compared against another applications.

This invention's Analysis System contains a range of visualization and reporting tools and pro-formas that may be customized. The visualization tools produce the range of 3D graphs and bivariate functions for engine and application data as well as standard graphs, charts and tables (see FIGS. 7 and 8). Report pro-formas include processing economic and environmental outcomes and presenting the data in the format detailed in relevant international standards or particular legislative, regulatory or customer requirements or requests.

This invention uses a Programming System to program the Control System and some sub-systems in the Information Feedback System.

The outcomes of the Engine Family Analysis processes detailed above are formatted into a library of generic system settings for each mapped engine family and, where appropriate for sub-sets of different engine capacity and/or configuration options within that family.

This library is stored in a portable computer or other appropriate programming device. The programming device is connected, via a serial data link, to the Control System during installation and is removed after programming is completed. For an engine of a mapped engine family, or engines similar to mapped engines, the relevant generic system settings are downloaded from the programming device into the Control System installed on that engine.

This process may be undertaken in reverse, and settings may be uploaded from the Control System on a particular engine into the programming device secondary storage device.

The programming device also includes tools for modifying or fine-tuning the generic settings in response to minor variations in engine or application configurations.

Figure 11:
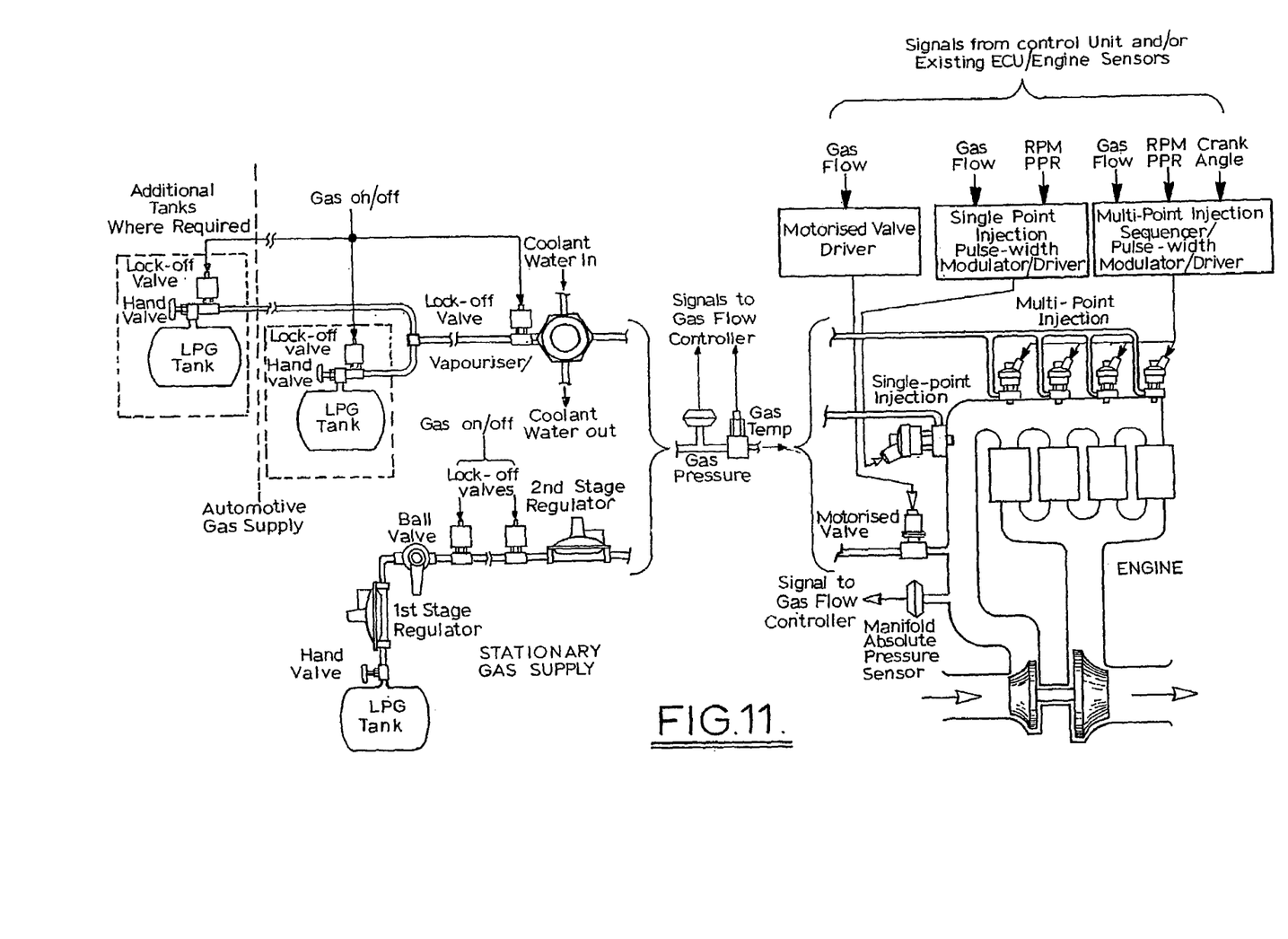
FIG. 11 is a gas delivery system diagram of one embodiment of this invention.

The Gas Delivery system of this invention is illustrated in FIG. 11. The Control System used in this invention forwards a continuous Gas-Flow-Signal from the Gas-Flow-Controller to the valve(s) motor driver or injector(s) pulser/sequencer installed in the Gas Delivery System. The motor driver or pulser responds to the signal by operating the valve or injector to deliver the required gas flow.

For valve and single injector systems, the Gas Delivery System delivers the required gas flow into the air inlet manifold of the diesel engine. Sequential multi-point injector systems deliver the gas in close proximity to each of the individual cylinder air inlet ports timed to the closing of the exhaust port for that cylinder.

The Control System State-Controller sub-system sends a gas shut-off signal to an appropriate gas lock-off sub-system in the Gas Delivery System whenever the engine/application is detected to be in a Fault state.

The Gas Delivery System includes standard approved gas fittings installed in compliance with the legislation, regulation and codes of practice relevant to the geographical area of operation for each application.

Those skilled in the art will realize that this invention can be implemented in a variety of ways without departing from the inventive concept. It is applicable to a range of diesel engine types and the substitution of gas for diesel is made without affecting engine or vehicle performance and contributes to improved fuel economy and improved environmental emissions.

The invention claimed is:

1. A system of analyzing engine performance to assist in the improved control of a dual fuel engine which includes;
   a) measuring devices for measuring parameters including engine load, RPM, fuel injected, air inlet temperature, exhaust temperature, oxygen or carbon dioxide levels in the exhaust gases, at discrete time intervals;
   b) electronic storage means for storing the data collected by the measuring devices at each of said discrete time intervals;
   c) analysis means to analyze the stored data to establish a data table for each parameter against each measured engine load and RPM point;
   d) imaging software means for presenting the data sets for each parameter as a 3 dimensional surface plotted against load and RPM.

2. A system of analyzing engine performance as claimed in claim 1 in which the data set is gas substitution plotted against load and RPM.

3. A method of controlling substitution of gas for diesel fuel in a dual fuel diesel engine which uses diesel as the fuel, comprising the steps:
   a) measuring parameters of an engine, the parameters including engine load, RPM, fuel injected, air inlet temperature, exhaust temperature, oxygen or carbon dioxide levels in the exhaust gases, at discrete time intervals;
   b) storing the measured parameter data;
   c) analyzing the stored data to establish a data table for each parameter against each measured engine load and RPM point;
   d) imaging software means for presenting the data sets for each parameter as a 3 dimensional surface plotted against load and RPM;
   e) determining the appropriate gas substitution for delivery as fuel to the engine.

4. A method as claimed in claim 3 in which the volume of gas is calculated to replace part of the energy supplied by the diesel fuel as a function of output load.

5. A method as claimed in claim 3 which is applied to a stationary engine and a governor output signal is used to derive instantaneous load and using that measurement to determine the gas substitution.

6. A method as claimed in claim 3 wherein the gas substitution determining step establishes the optimum gas substitution for each set of load and RPM values.

7. A method as claimed in claim 3 wherein the gas substitution determining step establishes the optimum gas substitution for each set of load and RPM values on the basis of desired rate of total fuel consumption, carbon dioxide, oxides of nitrogen and particulate content in the exhaust gases.

8. A control system for the substitution of gas for diesel in a dual fuel diesel engine which includes
   a) means for sensing or deriving RPM
   b) means for sensing or deriving Load
   c) means for storing a fuel requirements data table of respective parameters as a function of load and RPM, the data of the table having been preestablished by measurement and analysis for the parameters including engine load, RPM, fuel injected, air inlet temperature, exhaust temperature, oxygen or carbon dioxide levels in the exhaust gases, at discrete time intervals; and
   d) processing means for monitoring the load and RPM of the engine, and after comparing these to said stored data table, determining an appropriate gas substitution.

9. A gas substitution control system as claimed in claim 8 for an engine having an advanced electronic engine management system wherein the means to sense or derive RPM and load are part of the advanced electronic engine management system.

10. A control system as claimed in claim 8 which also includes means to sense the operational state of the vehicle and the engine including one or more of cruise control, manual control, braking, idling, cold start and accelerating.

11. A control system as claimed in claim 8 in which the data tables for each parameter are presented, using imaging software, as a 3 dimensional surface plotted against load and RPM.

* * * * *